US010063396B2

(12) United States Patent
Luo et al.

(10) Patent No.: US 10,063,396 B2
(45) Date of Patent: Aug. 28, 2018

(54) METHOD AND APPARATUS OF TOPOLOGICAL PILOT DECONTAMINATION FOR MASSIVE MIMO SYSTEMS

(71) Applicant: Hong Kong Applied Science and Technology Research Institute Company Limited, Hong Kong (HK)

(72) Inventors: Yaming Luo, Hong Kong (HK); Yuxian Zhang, Hong Kong (HK); Man Wai Kwan, Hong Kong (HK); Kong Chau Tsang, Hong Kong (HK)

(73) Assignee: Hong Kong Applied Science and Technology Research Institute Company Limited, Hong Kong (CN)

( * ) Notice: Subject to any disclaimer, the term of this patent is extended or adjusted under 35 U.S.C. 154(b) by 67 days.

(21) Appl. No.: 15/016,283

(22) Filed: Feb. 5, 2016

(65) Prior Publication Data

US 2017/0230203 A1    Aug. 10, 2017

(51) Int. Cl.
*H04L 25/02* (2006.01)
*H04B 7/0456* (2017.01)

(52) U.S. Cl.
CPC ....... *H04L 25/0256* (2013.01); *H04B 7/0456* (2013.01); *H04L 25/0204* (2013.01); *H04L 25/0242* (2013.01); *H04L 25/0228* (2013.01)

(58) Field of Classification Search
CPC .. H04B 7/0456; H04B 7/0473; H04B 7/0486; H04B 1/7103; H04B 1/71055; H04L 25/0228; H04L 25/024; H04L 25/0242; H04L 25/0246; H04L 25/0248; H04L 25/0256; H04L 25/0244; H04L 1/20; H04L 25/0204
See application file for complete search history.

(56) References Cited

U.S. PATENT DOCUMENTS

| 8,625,631 | B2 | 1/2014 | Papadopoulos | |
|---|---|---|---|---|
| 8,724,610 | B2 | 5/2014 | Ashikhmin et al. | |
| 8,897,269 | B2 | 11/2014 | Ji et al. | |
| 2008/0227397 | A1* | 9/2008 | Prasad | H04B 1/71055 455/63.1 |
| 2008/0231500 | A1* | 9/2008 | Heikkila | H04L 1/20 342/159 |

(Continued)

FOREIGN PATENT DOCUMENTS

| CN | 101795179 A | 8/2010 |
|---|---|---|
| CN | 103929383 A | 7/2014 |

(Continued)

OTHER PUBLICATIONS

Jeffrey G. Andrews, et al, What Will 5G Be?, IEEE Journal on Selected Areas in Communications, vol. 32, No. 6, Jun. 2014, 1065-1082.

(Continued)

*Primary Examiner* — Khoa Huynh
(74) *Attorney, Agent, or Firm* — Norton Rose Fulbright US LLP

(57) ABSTRACT

The presently claimed invention relates generally to a method and an apparatus for pilot decontamination for massive MIMO system and, more particularly, to a massive MIMO communication system based on channel estimation with topological interference alignment.

10 Claims, 6 Drawing Sheets

(56) References Cited

U.S. PATENT DOCUMENTS

2008/0317102 A1* 12/2008 Reial ................... H04B 1/7103
375/148

FOREIGN PATENT DOCUMENTS

| CN | 104243121 A | 12/2014 |
|---|---|---|
| WO | 2015149812 A1 | 10/2015 |

OTHER PUBLICATIONS

Lu Lu, et al, An Overview of Massive MIMO:Benefits and Challenges, IEEE Journal of Selected Topics in Signal Processing, vol. 8, No. 5, Oct. 2014, 742-758.
Babak Hassibi, "Topological Interference Alignment in Wireless Networks," Smart Antennas Workshop, Stanford, Aug. 1, 2014.
Stephen Boyd and Jon Dattorro, Alternating Projections, EE392o, Stanford University, Autumn, 2003.
International Search Report and Written Opinion issued for PCT Application No. PCT/CN2016/073634 dated Oct. 28, 2016.

* cited by examiner $$\Phi = \begin{bmatrix} 1 & 0 & 0 & 0 \\ 0 & 1 & 0 & 0 \\ 0 & 0 & 1 & 0 \\ 0 & 0 & 0 & 1 \end{bmatrix}$$

BS projection matrix

Each row represents the 4 time slots projection coefficient for each BS $$\Psi = \begin{bmatrix} 1 & 0 & 0 & 0 \\ 0 & 1 & 0 & 0 \\ 0 & 0 & 1 & 0 \\ 0 & 0 & 0 & 1 \end{bmatrix}$$

UE Pilot matrix

Each column represents the 4 time slots pilot signal for each UE

Fig. 2

METHOD AND APPARATUS OF TOPOLOGICAL PILOT DECONTAMINATION FOR MASSIVE MIMO SYSTEMS

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The following description relates generally to a method and an apparatus for pilot decontamination in a massive MIMO system (also known as "Large-Scale Antenna System") and, more particularly, to a massive MIMO communication system based on channel estimation with topological interference alignment.

BACKGROUND

Massive MIMO (multiple-input and multiple-output) is an emerging technology where the number of mobile terminals (UE) is much less than the number of base station antennas. In a rich scattering environment, the full advantages of the massive MIMO system can be exploited using simple beamforming strategies such as maximum ratio transmission (MRT) or zero forcing (ZF). To achieve these benefits of massive MIMO, accurate channel state information (CSI) must be available perfectly. However, in practice, the channel between the transmitter and receiver is estimated from orthogonal pilot sequences which are limited by the coherence time of the channel. Most importantly, in a multicell setup, the reuse of pilot sequences of several co-channel cells will create pilot contamination. When there is pilot contamination, the performance of massive MIMO degrades quite drastically.

If a base station (BS) is equipped with a large antenna number, there will be special aspect called channel hardening, which means the small scale fading is smoothed out by the asymptotically infinite number of antennas. Channel hardening refers to the phenomenon where the off-diagonal terms of the $H^H H$ matrix become increasingly weaker compared to the diagonal terms as the size of the channel gain matrix H increases.

For example, if one assumes each of all the L cells has K UEs (user equipment) for different cells their k-th UE use the same pilot slot, then the capacity with antenna number M approaching infinity can be expressed as $$I = \text{logdet}\left(I_M + \frac{\rho}{M}HH^H\right) \xrightarrow{M \to \infty} N\log(1+\rho)$$

because $$\frac{HH^H}{M} \xrightarrow{M \to \infty} I \qquad (1)$$

where the scalar $\rho$ is the transmit power, M is the number of the BS antenna, H is the channel gain matrix, $(\bullet)^H$ denotes the Hermitian matrix. When the number of transmit antennas M goes to infinity, the row vectors of H are asymptotically orthogonal, and hence one has $$\frac{HH^H}{M} \xrightarrow{M \to \infty} I.$$

Small scale fading parts disappear. Only large-scale fading (path-loss and shadowing) remains. They form the major part of pilot contamination.

To alleviate the effect of pilot contamination, one can only pay attention to this large scale fading (path-loss and shadowing). Fortunately, there is a partial connectivity feature in this large scale fading in practical systems. Not all the inter-cell interference links are strong enough to be attached equal importance. Only part of the links create strong interference, while others are negligible. Referring to FIG. 1, for a BS in a cell 1, the UEs on the cell edge will create strong inter-cell interference, but some UEs in cell 2 far from the BS only introduce negligible interference.

For example, if one has 4 BSs, 4 UEs (1 UE per BS) and 4 time slots for pilot, then the Tx (transmitter) pilot and Rx (receiver) projection design can be simple as shown in FIG. 2. One only needs to assign each UE one orthogonal slot. Referring to FIG. 2, $\Phi$ is a BS projection matrix in which the row number equals to the BS number 4, and the column number equals to the time slot number, each row represents the 4 time slots projection coefficient for each BS. $\Psi$ is a UE Pilot matrix in which the row number equals to the time slot number, and the column number equals to the UE number, each column represents the 4 time slots pilot signal for each UE. So in this example, the BS projection matrix is $\Phi_{4\times4}$, and the UE Pilot matrix is $\Psi_{4\times4}$.

However, in practice, the number of UE is always larger than the number of pilot slot. For example, if one has 6 BSs, 6 UEs (1 UE per BS) and 4 time slots for pilot, then the previous orthogonal pilot is unavailable. So in this example, the BS projection matrix is $\Phi_{6\times4}$, and the UE Pilot matrix is $\Psi_{4\times6}$. The pilots have to be overlapping in time resources as shown in FIG. 6.

In a TDD system, all the users in all the cells first synchronously send uplink data signals. Next, the users send pilot sequences. BSs use these pilot sequences to estimate CSI to the users located in their cells. Then, BSs use the estimated CSI to detect the uplink data and to generate beamforming vectors for downlink data transmission. However, due to the limited channel coherence time, the pilot sequences employed by users in neighboring cells may no longer be orthogonal to those within the cell, leading to a pilot contamination problem (FIG. 3).

For TDD-based massive MIMO transmission systems, pilot sequences are transmitted from users in the uplink to estimate channels. Let $\Psi_{k,l} = (\psi_{k,l}^{[1]}, \ldots, \psi_{k,l}^{[\tau]})^T$ be the pilot sequence of user k in cell l, where $\tau$ denotes the length of the pilot sequence. Though it is not necessary, it is convenient to assume that and one uses this assumption in what follows. Ideally, the pilot sequences employed by users within the same cell and in the neighboring cells should be orthogonal, that is $$\Psi_{k,l}^H \Psi_{j,l'} = \delta[k-j]\delta[l-l'] \qquad (2)$$

where $\delta[.]$ is defined as $$\delta[n] = \begin{cases} 1 & n = 0 \\ 0 & \text{otherwise} \end{cases} \quad (3)$$

In this case, a BS can obtain uncontaminated estimation of the channel vectors in the sense that they are not correlated to the channel vectors of other users.

However, the number of orthogonal pilot sequences with a given period and bandwidth is limited, which in turn limits the number of users that can be served. In order to handle more users, non-orthogonal pilot sequences are used in neighboring cells. Thus for some different k, j, l, and l', one may have $$\Psi_{k,l}{}^H \Psi_{j,l'} \neq 0 \quad (4)$$

As a result, the estimate of the channel vector to a user becomes correlated with the channel vectors of the users with non-orthogonal pilot sequences.

In summary, in a typical multi-cell massive MIMO system, users from neighboring cells may use non-orthogonal pilots. The reason for this is very simple—the number of orthogonal pilots is smaller than the number of users. The use of non-orthogonal pilots results in the pilot contamination problem. Pilot contamination causes directed inter-cell interference, which, unlike other sources of interferences, grows together with the number of BS antennas and significantly damages the system performance. Various channel estimation, precoding, and cooperation methods have been proposed to resolve this issue. However, more efficient methods with good performance, low complexity, and limited or zero cooperation between BSs are worth more intensive study.

SUMMARY OF THE INVENTION

Accordingly, an aspect of the present invention is to provide a method and an apparatus for pilot decontamination in a massive MIMO system.

In accordance with an embodiment of the presently claimed invention, a method of topological pilot decontamination in a massive Multiple-Input Multiple-Output (MIMO) system, the system comprising one or more base stations (BSs), one or more user equipments (UEs), and a central controller, the method comprising:
  obtaining, by the central controller, a large scale fading matrix based on the channel gains obtained from the BSs;
  obtaining, by the central controller, a square topological matrix based on the large scale fading matrix;
  normalizing, by the central controller, the square topological matrix to form a normalized square topological matrix;
  obtaining, by the central controller, a pilot matrix by matrix decomposition based on the normalized square topological matrix and the number of pilot resources;
  obtaining, by the central controller, an optimized estimator projection matrix based on the pilot matrix and the square topological matrix; and
  performing, by an individual BS, a channel estimation based on the optimized estimator projection matrix and pilots transmitted by UEs where the pilots of all UEs are given by the pilot matrix.

Preferably, the pilot resources are located in an orthogonal domain including time domain, frequency domain, or code domain.

Preferably, the step of obtaining square topological matrix further comprises: transforming the large scale fading matrix to the square topological matrix by dividing each of the BSs, which serves multiple UEs, to virtual BSs, wherein each of the virtual BSs serves one UE and has the same parameters as its corresponding original BS.

Preferably, the step of normalizing the square topological matrix further comprises: normalizing channel gain vectors of each of the UEs in the square topological matrix with respect to a desired link channel gain, by multiplying the square topological matrix with a normalizing matrix, wherein the normalizing matrix is a diagonal matrix with the inverse of desired link channel gains as the diagonal values.

Preferably, the step of obtaining pilot matrix further comprises:
  obtaining a partial connectivity matrix by rounding negligible entries in the normalized square topological matrix to zero with a pre-defined threshold;
  obtaining a complimentary matrix based on the partial connectivity matrix by making non-diagonal elements with non-zero value in the partial connectivity matrix be zero, and assigning each of the zero elements in the partial connectivity matrix with an arbitrary value;
  obtaining a normalized pilot matrix by decomposing the complimentary matrix into a BS projection matrix and the normalized pilot matrix based on the number of the pilot resources, wherein both of the BS projection matrix and the normalized pilot matrix satisfy the following requirements:
    a product of the BS projection matrix and the normalized pilot matrix gives the complimentary matrix; and
    the BS projection matrix is of size K×T, while the normalized pilot matrix is of size T×K, where K is the number of UEs in all cells, and T is the number of the pilot resources.
  obtaining the pilot matrix by multiplying the normalized pilot matrix by a normalizing matrix.

Preferably, the pilot matrix is obtained by a topological interference alignment computation, the computation comprising:
  generating a K×K random matrix $A^0$ and setting i=0;
  processing iteratively the following steps:
    obtaining the singular value decomposition (SVD) of $A^i$: $A^i = U^i \Sigma^i V^{i^H}$, obtaining $\tilde{\Sigma}^i$ by forcing the smallest (K−T) singular values on the diagonal of $\Sigma^i$ to zero, and obtaining $B^i = U^i \tilde{\Sigma}^i V^{i^H}$;
    obtaining $A^{i+1}$ by forcing the diagonal elements to one and the corresponding elements with 0 in $$\tilde{D}^{\frac{1}{2}}$$

to zero as below:

$$A^{i+1}(j,k) = \begin{cases} \tilde{D}^{\frac{1}{2}}(j,k) & \text{if } \tilde{D}^{\frac{1}{2}}(j,k) = 0 \text{ or } \tilde{D}^{\frac{1}{2}}(j,k) = 1 \\ B^i(j,k) & \text{otherwise} \end{cases};$$

if $A^{i+1}$ converges, break the iteration; otherwise, set i=i+1 and go to next iteration;
  obtaining the pilot matrix as $$\Psi = (\Sigma^i)^{\frac{1}{2}} V^{iH}.$$

Preferably, the step of performing the channel estimation further comprises: sending, by each of the UEs, pilots indicated by its respective column of the pilot matrix.

Preferably, the step of performing the channel estimation further comprises: projecting the received pilots using the optimized estimator projection matrix.

Preferably, the estimator projection matrix is obtained by Minimum mean square error (MMSE) method.

BRIEF DESCRIPTION OF THE DRAWINGS

Embodiments of the present invention are described in more detail hereinafter with reference to the drawings, in which:

FIG. 2 shows a BS projection matrix and a UE pilot matrix;

DETAILED DESCRIPTION

In the following description, methods for pilot decontamination in a massive MIMO system are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

As discussed above, consider a system with L cells. Each cell is assumed to have K single-antenna users and a BS with M antennas, where M>>K. For purposes of illustration, one assumes that all L cells use the same set of K pilot sequences.

As the number of BS antennas grows large, i.e., M→∞, the SINR (Signal to Interference plus Noise Ratio) of the k-th user in the j-th cell tends to the following limit $$SINR_{k,j}^u = \frac{d_{j,k,j}^2}{\sum_{l \ne j} d_{j,k,l}^2} \quad (5)$$

where $d_{j,k,l}$ is the large-scale channel fading coefficient. From (5), the SINR depends only on the large-scale fading factors of the channels while the small-scale fading factors and noise are averaged out. So in massive MIMO, one can utilize the strong large scale fading for pilot contamination cancelation.

Figure 1:
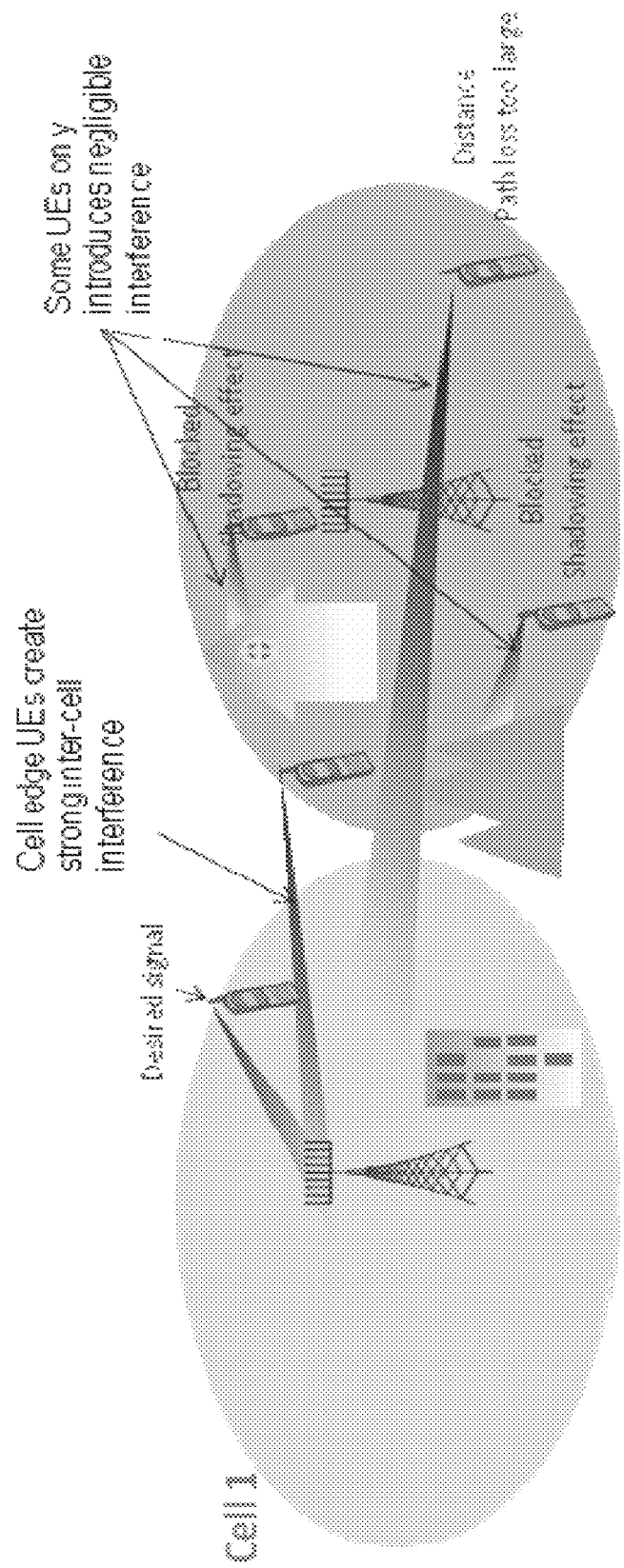
FIG. 1 shows a graph illustrating channel fading in a wireless system.
Figure 3:
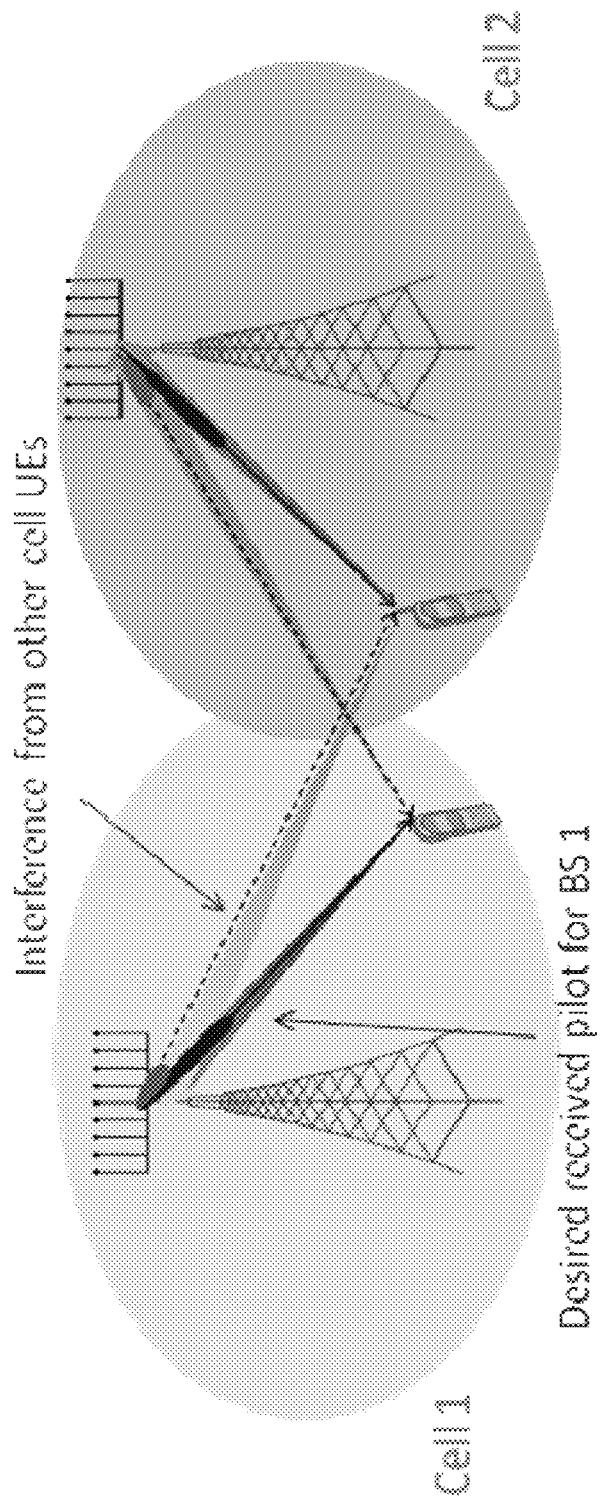
FIG. 3 shows pilot contamination and interference from other cell UEs.

As discussed above for FIG. 1, not all the inter-cell interference links are strong enough. Only the UEs on the cell edge will create strong inter-cell interference, some UEs only introduce negligible interference. The partial connectivity enables orthogonal pilot transmission for more UEs than pilot slot number. One can use topological interference alignment to achieve this based on the partial connectivity.

Figure 4:
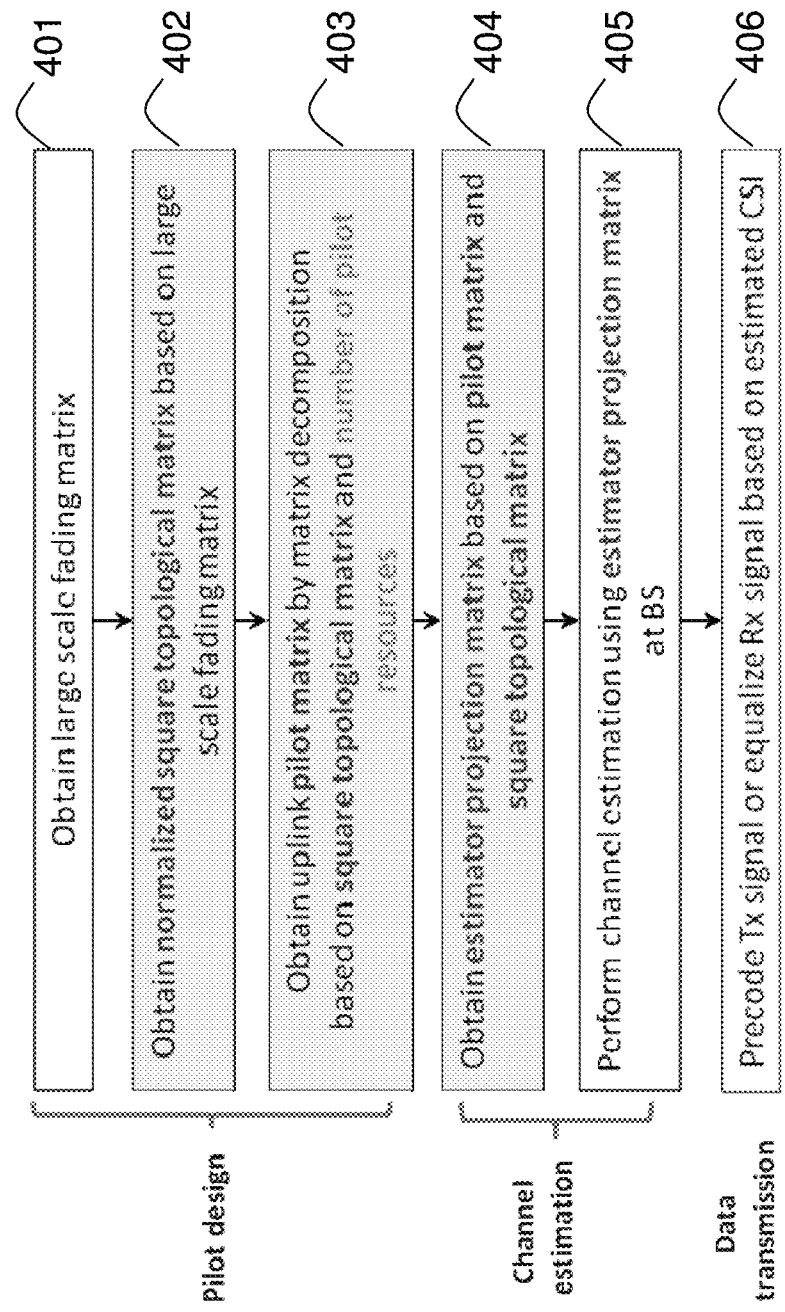
FIG. 4 illustrates a flow chart of a method of topological pilot decontamination for massive MIMO systems according to the present invention.

FIG. 4 discloses a flow chart describing a method of topological pilot decontamination for massive MIMO systems of the presently claimed invention. In step 401, a large scale fading matrix is obtained from BSs. In step 402, a normalized square topological matrix is obtained based on the large scale fading matrix. In step 403, an uplink pilot matrix is obtained by matrix decomposition based on the square topological matrix and the number of pilot resources. In step 404, an optimized estimator projection matrix is obtained based on the pilot matrix and the square topological matrix. In step 405, channel estimation is performed using the optimized estimator projection matrix at the BSs. In step 406, transmitted signal is precoded and received signal is equalized based on the estimated channel state information (CSI).

Figure 5:
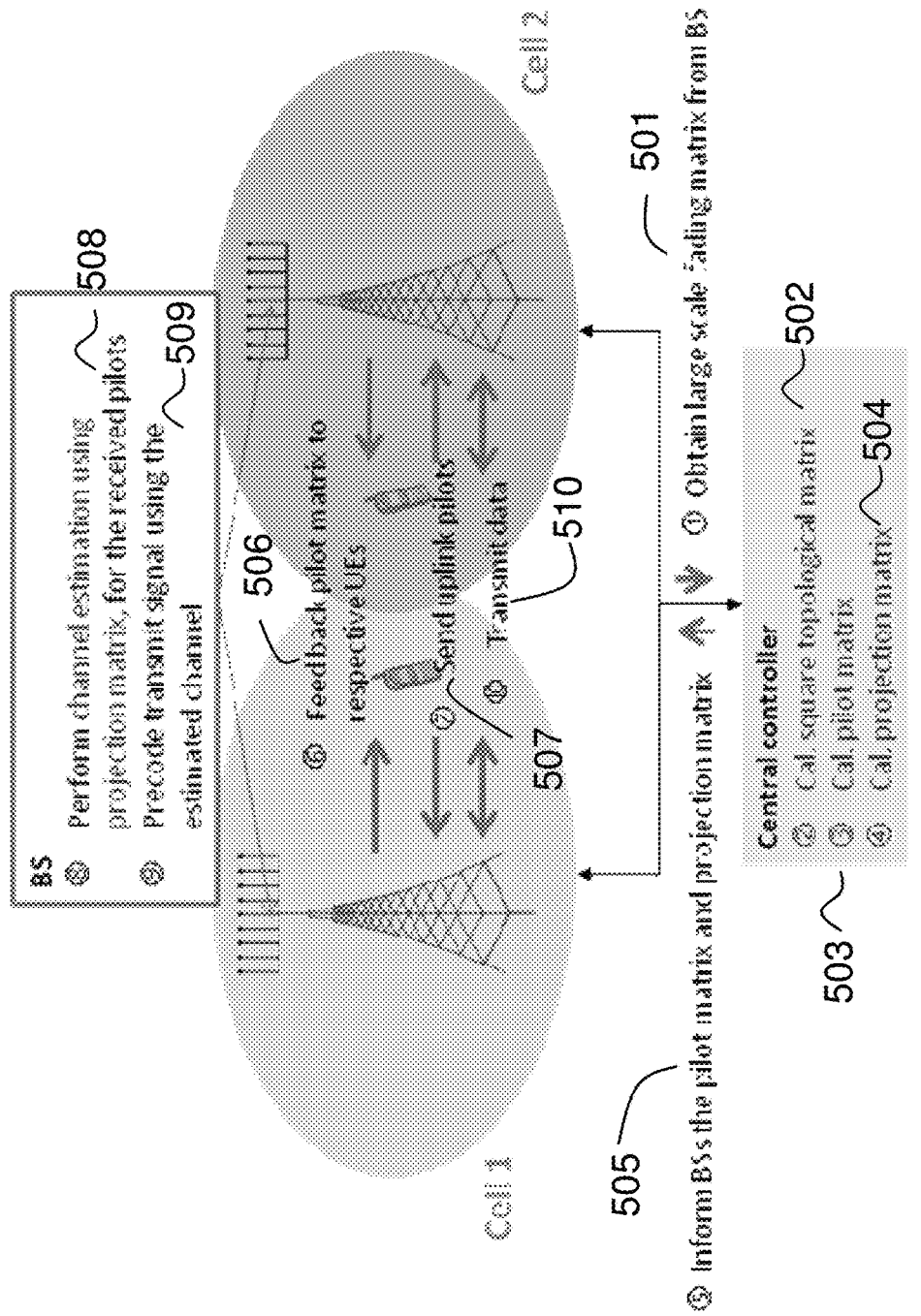
FIG. 5 illustrates a massive MIMO communication system framework based on channel estimation with topological interference alignment according to the present invention.

FIG. 5 further illustrates a massive MIMO communication system framework based on channel estimation with topological interference alignment according to the present invention.

Referring to FIG. 5, in step 501, a central controller obtains a large scale fading matrix from BSs. Then a normalized square topological matrix is calculated based on the large scale fading matrix in step 502. In step 503, the central controller derives an uplink pilot matrix by matrix decomposition based on the square topological matrix and the number of pilot resources. Then, in step 504, an optimized estimator projection matrix is obtained based on the pilot matrix and the square topological matrix. In step 505, the central controller informs BSs the pilot matrix and the projection matrix. Then, at BSs side, in step 506, BSs feedback the pilot matrix to respective UEs. And UEs send uplink pilots to BSs in step 507. In step 508, BSs perform channel estimation using the optimized estimator projection matrix for the received pilots. Lastly, in step 509, for data transmission, transmit signal or equalize receiver signal can be precoded based on the estimated channel.

As for step 502, regarding that cases whose large scale fading matrix is not square, such as each BS serving 2 UEs, one has to transform the large scale fading matrix into a square matrix. For example, each BS is divided into 2 virtual BSs, and each virtual BS corresponding to one UE. Then one normalizes the channel gain of each UE based on the desired link. In this way, the diagonal becomes 1.

In order to further explain step 502, an example is used for further illustration. Accordingly, there are 3 BSs, and 2 UEs/BS. An original large scale fading matrix is provided as follows:

$$BS \begin{bmatrix} \overbrace{\begin{bmatrix} 0.8 & 1.25 & 0.1 & 0.08 & 0.03 & 0.4 \\ 0.04 & 0.35 & 1 & 2 & 0.15 & 0.075 \\ 0.01 & 0.2 & 0.06 & 0.12 & 0.5 & 1 \end{bmatrix}}^{UE} \end{bmatrix}$$

When the number of UEs is not equal to the number of BSs, the large scale fading matrix is transformed to a square matrix (which is the square topological matrix) by treating BS serving multiple UEs as multiple BSs such that the large scale fading matrix is extended to the square matrix by the virtual BSs as shown in the below matrix:

$$\begin{bmatrix} 0.8 & 1.25 & 0.1 & 0.08 & 0.03 & 0.4 \\ 0.8 & 1.25 & 0.1 & 0.08 & 0.03 & 0.4 \\ 0.4 & 0.35 & 1 & 2 & 0.15 & 0.75 \\ 0.4 & 0.35 & 1 & 2 & 0.15 & 0.75 \\ 0.01 & 0.2 & 0.06 & 0.12 & 0.5 & 1 \\ 0.01 & 0.2 & 0.06 & 0.12 & 0.5 & 1 \end{bmatrix}.$$

The normalized square topological matrix is determined by normalizing the channel gain of each UE according to the desired link (diagonal elements). In this example, the diagonal elements are 0.8, 1.25, 1, 2, 0.5 and 1.

After normalizing each column to channel gain in desired link, and incorporating desired link channel gain in the algorithm, a normalized square topological matrix is obtained as follows.

$$\begin{bmatrix} 1 & 1 & 0.1 & 0.04 & 0.06 & 0.4 \\ 1 & 1 & 0.1 & 0.04 & 0.06 & 0.4 \\ 0.5 & 0.28 & 1 & 1 & 0.3 & 0.075 \\ 0.5 & 0.28 & 1 & 1 & 0.3 & 0.075 \\ 0.0125 & 0.16 & 0.06 & 0.06 & 1 & 1 \\ 0.0125 & 0.16 & 0.06 & 0.06 & 1 & 1 \end{bmatrix}$$

According to an embodiment of the present invention, the normalized square topological matrix is obtained as follow: transforming the large scale fading matrix to 2-dim matrix $\hat{D}$ L×KL, the (l,n)-th entry of which is $$\hat{d}_{ln} = b_{kkjl}, \; k = n - K - K\left\lfloor\frac{n-1}{K}\right\rfloor, \; j = \left\lfloor\frac{n-1}{K}\right\rfloor + 1.$$

transforming it to a square matrix D KL×KL the (i,n)-th entry of which is $$\ddot{d}_{in} = \hat{d}_{ln}, l = \left\lfloor\frac{i-1}{K}\right\rfloor + 1.$$

obtaining the normalized square topological matrix by normalizing each column based on the diagonal $\ddot{D}$ $$\ddot{D} = \ddot{D}\,\text{diag}(\ddot{D})^{-1}.$$

In order to clearly explain the step 503 of pilot matrix design, an example will help to understand. For example, one has 4 time slots as pilot resources, 6 BSs and 6 UEs. All UEs use same desired channel. Assume that the normalized square topological matrix is $$\xrightarrow{UE}$$

$$BS \Bigg\downarrow \begin{bmatrix} 1 & 1 & 0.1 & 0.04 & 0.06 & 0.4 \\ 1 & 1 & 0.1 & 0.04 & 0.06 & 0.4 \\ 0.5 & 0.28 & 1 & 1 & 0.3 & 0.075 \\ 0.5 & 0.28 & 1 & 1 & 0.3 & 0.075 \\ 0.0125 & 0.16 & 0.06 & 0.06 & 1 & 1 \\ 0.0125 & 0.16 & 0.06 & 0.06 & 1 & 1 \end{bmatrix}.$$

By rounding the negligible entries in the normalized square topological matrix to 0 with a pre-defined threshold 0.1, one obtains the partial connectivity matrix.

The dominant non-diagonal entries in the partial connectivity matrix greater than or equal to the threshold 0.1 will be rounded up to 0, and the negligible entries less than the threshold 0.1 can be arbitrary value X. That means, dominant interference needs to be forced to zero, and weak interference (shadow/path loss) can be arbitrary value. Then, one obtains the complementary matrix as follows:

$$\xrightarrow{UE}$$

$$(\tilde{D})^{1/2} = BS \Bigg\downarrow \begin{bmatrix} 1 & 0 & 0 & X & X & 0 \\ 0 & 1 & 0 & X & X & 0 \\ 0 & 0 & 1 & 0 & 0 & X \\ 0 & 0 & 0 & 1 & 0 & X \\ X & 0 & X & X & 1 & 0 \\ X & 0 & X & X & 0 & 1 \end{bmatrix}$$

Figures 6, 7:
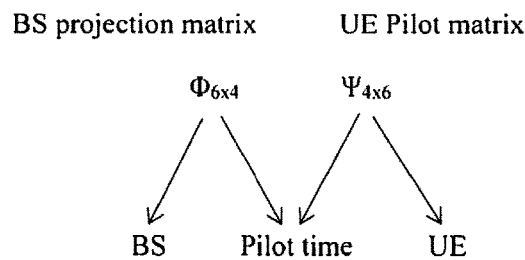
FIG. 6 is a diagram illustrating aspects of pilots overlapping in time resources.
FIG. 7 is a diagram illustrating decomposition of a complimentary matrix into a BS projection matrix and a UE pilot matrix.

With the complimentary matrix, one can compute and obtain a pilot matrix by matrix decomposition. Recall that one has 4 time slots as pilot resources. Then, one decomposes the complimentary matrix into a BS projection matrix $\Phi_{6\times 4}$ and an UE pilot matrix $\Psi_{4\times 6}$ as shown in FIG. 7.

Both of the BS projection matrix and the normalized pilot matrix satisfy the following requirements: a product of the BS projection matrix and the UE pilot matrix gives the complimentary matrix; and the BS projection matrix is of size K×T, while the normalized pilot matrix is of size T×K, where K is the number of columns of the complimentary matrix, and T is the number of the pilot resources.

Matrix decomposition can be computed by alternating projection algorithm. The pilot matrix is determined based on the UE pilot matrix.

According to an embodiment of the present invention, a pilot matrix is obtained by the following steps:

obtaining a partial connectivity matrix D by rounding negligible elements with a pre-defined threshold $d_{th}$ as follows:

$$\ddot{D}(\ddot{D} \le d_{th}) = 0, D = \ddot{D}.$$

obtaining complimentary matrix D of the partial connectivity matrix as follows:

$$\tilde{d}_{in} = \begin{cases} 1 & i = n \\ 0 & d_{in} \ne 0, \text{ and } i \ne n \\ X & \text{else} \end{cases}$$

obtaining the matrix decomposition for this complimentary matrix as follows:

$$(\tilde{D})^{1/2} = \Phi\tilde{\Psi}$$

changing back the pilot power based on the normalizing matrix as follows:

$$\hat{\Psi} = \hat{\Psi} \mathrm{diag}(\tilde{D})^{-1}$$

In brief, one obtains a pilot matrix by decomposing the complimentary matrix based on the number of pilot resources (e.g., time slots).

For obtaining channel estimation, according to an embodiment of the present invention, each UE sends the pilots indicated by respective column of the pilot matrix, the estimator projection matrix is calculated using MMSE based on the square topological matrix and the pilot matrix, and channel estimation is performed using the estimator projection matrix.

According to an embodiment of the present invention, the estimator projection matrix $C_{jl}$ is calculated and the channel estimation is performed by the below equations:

$$C_{jl} = \sqrt{P_rT}\, B_{jl}^{\frac{1}{2}} \Psi_j^H \left( I + P_rT \sum_{i=1}^{L} \Psi_i B_{il} \Psi_i^H \right)^{-1}$$

where $\Psi_i = \hat{\Psi}(:, (i-1)K+1 : iK)$; and $\hat{H}_{jl} = C_{jl} Y_l$;

where $\Psi^H_i$ is the pilot matrix of UEs in the i-th cell, $B_{jl}$ is the large scale fading matrix from the j-th cell's UEs to the l-th cell's BS, $P_r$ is the UE uplink transmit power, T is the number of pilot resources, L is the number of cells, $\hat{H}_{jl}$ is the estimate of channel gain matrix from the j-th cell's UEs to the l-th cell's BS, and $Y_1$ is the signal vector of the pilots sent from the j-th cell's UEs and received at the l-th cell's BS.

In the present invention, topological interference alignment is utilized to design the pilot with low interference. Using less time slots, interference-free pilots for more UEs can be transmitted.

In the present invention, obtaining normalized square topological matrix based on the large scale fading matrix is a pre-processing process, which is able to deal with the cases when the number of UE is not equal to the number of BS, and different UEs need different channels. Obtaining estimator projection matrix based on the pilot matrix and the square topological matrix is a post-processing process, which is able to get optimized projection matrix, especially at low SNR case.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for performing channel estimation in a massive multi-input multi-output (MIMO) system having a plurality of base stations (BSs), a plurality of user equipments (UEs), and a central controller, the method comprising the steps of:
   obtaining, by the central controller, a large scale fading matrix from the plurality of BSs;
   deriving, by the central controller, a normalized square topological matrix based on the large scale fading matrix;
   rounding, by the central controller, entries of the normalized square topological matrix having values less than a pre-defined threshold to zero to produce a partial connectivity matrix;
   generating, by the central controller, a complimentary matrix from the partial connectivity matrix by setting non-diagonal elements in the partial connectivity matrix having a non-zero value to zero and assigning each element in the partial connectivity matrix having a value of zero in the partial connectivity matrix with an arbitrary value, wherein setting the non-diagonal elements in the partial connectivity matrix having a non-zero value to zero forces dominant interference to zero, and wherein assigning each element having a value of zero in the partial connectivity matrix with an arbitrary value allows weak interference to take on the arbitrary value;
   obtaining, by the central controller, a pilot matrix by matrix decomposition based on the complimentary matrix and a number of pilot resources to achieve topological pilot decontamination;
   generating, by the central controller, an estimator projection matrix based on the pilot matrix and the normalized square topological matrix;
   initiating, by the central controller, transmission of the estimator projection matrix to the plurality of BSs and the pilot matrix to the plurality of UEs, wherein each of the plurality of UEs send uplink pilot signals to at least one of the plurality of BSs based on the pilot matrix; and
   performing, by an individual BS of the plurality of BSs, the channel estimation based on the estimator projection matrix and pilot signals received from one or more UEs of the plurality of UEs, wherein the pilot signals of all the plurality of UEs are given by the pilot matrix.

2. The method of claim 1, wherein the pilot resources are located in an orthogonal domain selected from a time domain, a frequency domain and a code domain.

3. The method of claim 1, wherein the step of obtaining the normalized square topological matrix comprises:
   transforming the large scale fading matrix to the normalized square topological matrix by dividing each of the BSs, which serves multiple UEs, to virtual BSs, wherein each of the virtual BSs serves one UE.

4. The method of claim 1, wherein the step of normalizing the normalized square topological matrix comprises:
   normalizing a channel gain vector of an individual UE in the normalized square topological matrix with respect to a desired link channel gain of the individual UE.

5. The method of claim 1, wherein the step of obtaining pilot matrix comprises:
   obtaining a normalized pilot matrix by decomposing the complimentary matrix into a BS projection matrix and the normalized pilot matrix based on the number of the pilot resources such that a product of the BS projection matrix and the normalized pilot matrix gives the complimentary matrix, wherein the BS projection matrix is of size K×T, while the normalized pilot matrix is of size T×K, where K is the number of the UEs, and T is the number of the pilot resources; and
   obtaining the pilot matrix by multiplying the normalized pilot matrix with a normalizing matrix.

6. The method of claim 5, wherein the normalized pilot matrix is obtained by a topological interference alignment computation, the computation comprising the steps of:
generating a K×K random matrix $A^0$;
computing $A^{i+1}$ from $A^0$ by iteratively computing $A^{i+1}$ from $A^i$ until $A^{i+1}$ converges, wherein the computing of $A^{i+1}$ from $A^i$ comprises:
obtaining a singular value decomposition (SVD) of $A^i$ to give $A^i = U^i \Sigma^i V^{iH}$;
obtaining $\tilde{\Sigma}^i$ by forcing smallest K-T singular values on the diagonal of $\Sigma^i$ to zero;
computing $B^i = U^i \tilde{\Sigma}^i V^{iH}$; and
obtaining $A^{i+1}$ by setting the diagonal elements thereof to one and corresponding elements having values of 0 in $$\tilde{D}^{\frac{1}{2}}$$

to zero according to $$A^{i+1}(j,k) = \begin{cases} \tilde{D}^{\frac{1}{2}}(j,k) & \text{if } \tilde{D}^{\frac{1}{2}}(j,k) = 0 \text{ or } \tilde{D}^{\frac{1}{2}}(j,k) = 1 \\ B^i(j,k) & \text{otherwise} \end{cases};$$

after $A^{i+1}$ converges, obtaining the normalized pilot matrix as $$\Psi = (\Sigma^i)^{\frac{1}{2}} V^{iH}$$

7. The method of claim 1, wherein the step of performing the channel estimation comprises:
sending, by the UEs, the pilots each being obtained as a column of the pilot matrix.

8. The method of claim 1, wherein the estimator projection matrix, denoted as $C_{jl}$, is obtained by a minimum mean square error (MMSE) method as follows:

$$C_{jl} = \sqrt{P_r T} B_{jl}^{\frac{1}{2}} \Psi_j^H \left( I + P_r T \sum_{i=1}^{L} \Psi_i B_{il} \Psi_i^H \right)^{-1}$$

where $\Psi_j^H$ is the pilot matrix of the UEs in the i-th cell, $B_{jl}$ is the large scale fading matrix from the j-th cell's UEs to the l-th cell's BS, $P_r$, is a UE uplink transmit power, T is the number of the pilot resources, and L is the number of cells.

9. The method of claim 1, wherein the step of performing the channel estimation comprises:
projecting the received pilot signals using the estimator projection matrix.

10. The method of claim 9, wherein the received pilot signals are projected using the estimator projection matrix as follows:

$$\hat{H}_{jl} = C_{jl} Y_l$$

where $\hat{H}_{jl}$ is an estimate of channel gain from the j-th cell's UEs to the l-th cell's BS, $C_{jl}$ is the estimator projection matrix, and $Y_l$ is a signal vector of pilots sent from the j-th cell's UEs and received by the l-th cell's BS.

* * * * *

UNITED STATES PATENT AND TRADEMARK OFFICE
CERTIFICATE OF CORRECTION

PATENT NO. : 10,063,396 B2  
APPLICATION NO. : 15/016283  
DATED : August 28, 2018  
INVENTOR(S) : Yaming Luo et al.

Page 1 of 1

It is certified that error appears in the above-identified patent and that said Letters Patent is hereby corrected as shown below:

In the Specification

At Column 7, Line number 44, delete "matrix D" and replace with --matrix $\tilde{D}$--.
At Column 8, Line number 55, delete "matrix D" and replace with --matrix $\tilde{D}$--.
At Column 9, Line number 3, delete "$\tilde{\Psi} = \Psi \text{diag}(\tilde{D})^{-1}$" and replace with --$\tilde{\Psi} = \Psi \text{diag}(\tilde{D})^{-1}$--.

In the Claims

At Column 11, Claim number 6, Line number 10, delete "$\tilde{\Sigma}^{i}$" and replace with --$\tilde{\Sigma}^{i}$--.
At Column 11, Claim number 6, Line number 28, insert --and-- before "after $A^{i+1}$ converges".
At Column 12, Claim number 8, Line number 15, delete "$\Psi_j^H$" and replace with --$\Psi_i^H$--.

Signed and Sealed this
Sixteenth Day of October, 2018

Andrei Iancu
*Director of the United States Patent and Trademark Office*